United States Patent
Otomitsu

(10) Patent No.: US 10,338,324 B2
(45) Date of Patent: Jul. 2, 2019

(54) OPTICAL CONNECTOR

(71) Applicant: FUJIKURA LTD., Tokyo (JP)

(72) Inventor: Takahito Otomitsu, Chiba (JP)

(73) Assignee: FUJIKURA LTD., Tokyo (JP)

( * ) Notice: Subject to any disclaimer, the term of this patent is extended or adjusted under 35 U.S.C. 154(b) by 0 days.

(21) Appl. No.: 15/770,172

(22) PCT Filed: Dec. 13, 2016

(86) PCT No.: PCT/JP2016/087110
§ 371 (c)(1),
(2) Date: Apr. 20, 2018

(87) PCT Pub. No.: WO2017/130589
PCT Pub. Date: Aug. 3, 2017

(65) Prior Publication Data
US 2018/0314015 A1    Nov. 1, 2018

(30) Foreign Application Priority Data

Jan. 29, 2016  (JP) ................................. 2016-015367

(51) Int. Cl.
*G02B 6/38*   (2006.01)
*G02B 6/36*   (2006.01)

(52) U.S. Cl.
CPC ............ *G02B 6/3897* (2013.01); *G02B 6/36* (2013.01); *G02B 6/3875* (2013.01); *G02B 6/3879* (2013.01)

(58) Field of Classification Search
None
See application file for complete search history.

(56) References Cited

U.S. PATENT DOCUMENTS

| 5,138,679 | A | * | 8/1992 | Edwards | G02B 6/3869 |
| | | | | | 250/227.11 |
| 5,528,711 | A | | 6/1996 | Iwano et al. | |
| 6,419,399 | B1 | * | 7/2002 | Loder | G02B 6/3869 |
| | | | | | 385/53 |
| 2003/0180004 | A1 | * | 9/2003 | Cox | G02B 6/381 |
| | | | | | 385/53 |

(Continued)

FOREIGN PATENT DOCUMENTS

| JP | S58-172903 U | 11/1983 |
| JP | H03-164704 A | 7/1991 |

(Continued)

OTHER PUBLICATIONS

English translation of written opinion for PCT/JP2016/087110, dated Mar. 14, 2017. (Year: 2017).*

(Continued)

*Primary Examiner* — Michael Stahl
(74) *Attorney, Agent, or Firm* — Osha Liang LLP

(57) ABSTRACT

An optical connector includes: a housing that houses a ferrule; a mounting member that movably attaches the housing to a board in a direction perpendicular to connector insertion and removal directions; and a first elastic member arranged between the mounting member and the housing. The housing is held in the mounting member via the elastic member and a space is maintained between a peripheral surface of the housing and the mounting member.

10 Claims, 11 Drawing Sheets

(56) References Cited

U.S. PATENT DOCUMENTS

2004/0013388 A1    1/2004  Fujiwara et al.

FOREIGN PATENT DOCUMENTS

| | | |
|---|---|---|
| JP | H04-235508 A | 8/1992 |
| JP | H05-45541 A | 2/1993 |
| JP | H09-311245 A | 12/1997 |
| JP | H11-183753 A | 7/1999 |
| JP | 2002-122754 A | 4/2002 |
| JP | 2014-106440 A | 6/2014 |

OTHER PUBLICATIONS

Office Action issued in corresponding Japanese Patent Application No. 2016-015367 dated Aug. 22, 2017 (2 pages).
Office Action issued in corresponding Chinese Patent Application No. 201680060510.5 dated Apr. 1, 2019 (12 pages).

\* cited by examiner

OPTICAL CONNECTOR

TECHNICAL FIELD

The present disclosure relates to an optical connector.

BACKGROUND

As a plug-in type optical connector, namely a backplane connector is known. With the backplane connector, by inserting a printed board in a plug-in unit, an optical connector attached to a backplane of the plug-in unit, and an optical connector attached to the printed board are connected. For example, in Patent Literatures 1 and 2, such a backplane connector is disclosed. Patent Literature 1 discloses a coupling mechanism of an optical connector having an outer housing and an inner housing. Patent Literature 2 discloses that by making the optical connector to the backplane side float in respect to the backplane, misalignment when fitting the optical connectors to each other can be absorbed.

CITATION LIST

Patent Literature

[PTL 1] Japanese Patent Application Publication No. H5-45541
[PTL 2] Japanese Patent Application Publication No. H11-183753

With the optical connector disclosed in Patent Literature 2, a mounting hole is formed in the backplane perpendicular to the direction of attaching/detaching the optical connector, and by ensuring a clearance between a fixing component that fixes the backplane housing and the mounting hole (by ensuring a clearance around the fixing component), a floating range of the backplane housing is set.

With the configuration disclosed in Patent Literature 2, however, before the optical connector is fitted, there is a possibility that the backplane housing will be in a position biased in respect to the floating range. For example, there is a possibility that the backplane housing is arranged to a lower edge side of the mounting hole due to such as influence of force of gravity.

When the backplane housing is arranged biased in respect to the floating range in this way, there is a possibility that fitting of optical connectors to each other is degraded. Further, in the case that the backplane housing is arranged biased in respect to the floating range in this way, misalignment of optical connectors (such as dimension tolerance) needs to be made small, and this will also restrict the design. This issue is not limited to the backplane connector, but is also an issue that arises in the case that the optical connector is configured floatably in respect to the board (for example, the backplane and the middle plane and the like).

SUMMARY

One or more embodiments of the present invention suppress a housing of an optical connector from being biased in respect to a floating range.

One or more embodiments of the present invention is an optical connector including: a housing that houses a ferrule; a mounting member that attaches to a board the housing movably in a direction perpendicular to a connector insertion and removal direction; and an elastic member arranged between the mounting member and the housing, wherein the housing is held in the mounting member via the elastic member, with a space maintained between a peripheral surface of the housing and the mounting member.

Other features will become clear from the disclosure of the specification and drawings to be described later.

According to one or more embodiments of the present invention, a housing of an optical connector being biased in respect to a floating range can be suppressed.

DETAILED DESCRIPTION

Figure 1:
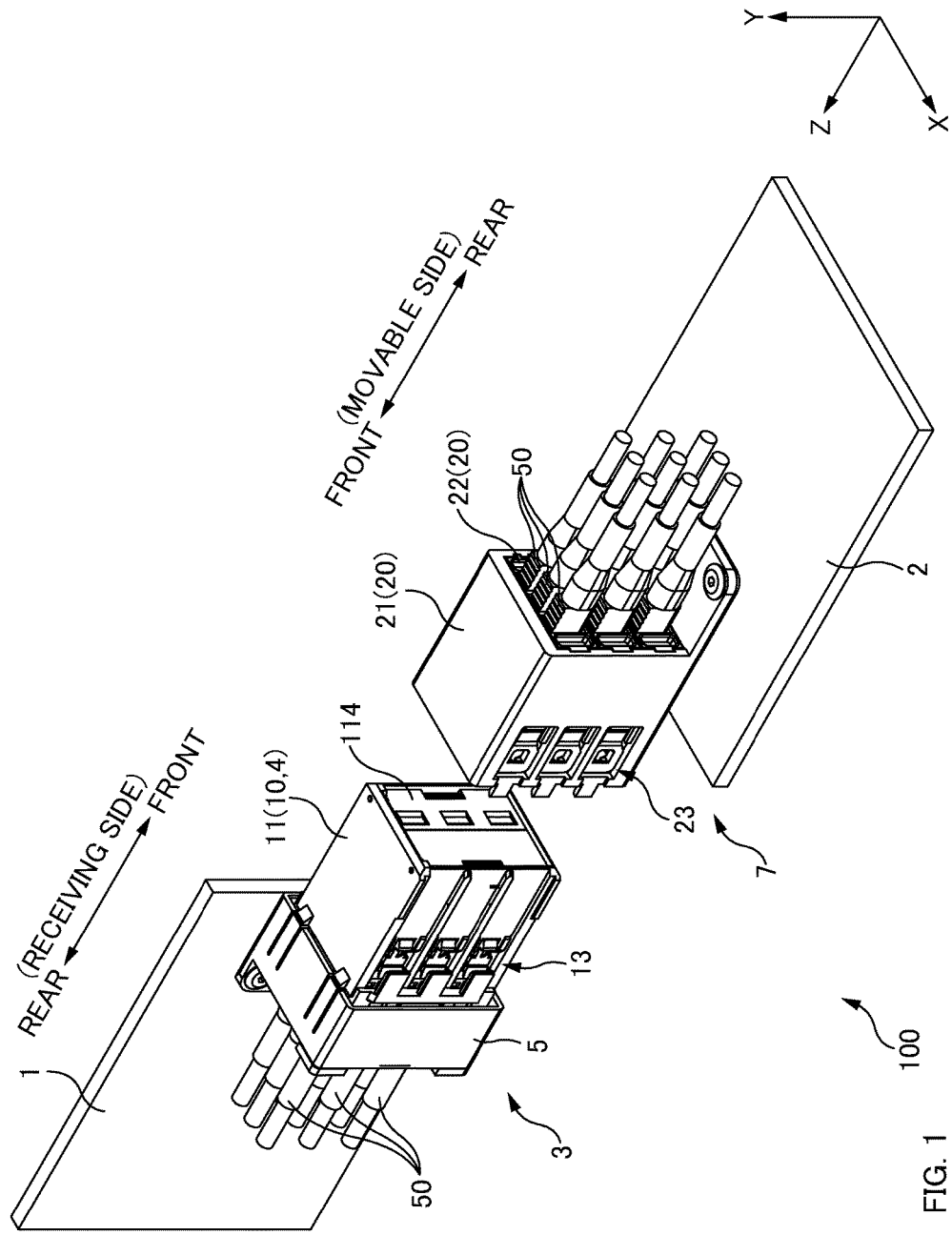
FIG. 1 is a perspective view of an optical connector system 100 in an initial position before connectors are connected according to one or more embodiments.

At least below matters will become clear from descriptions in this specification and attached drawings.

An optical connector will become clear, including: a housing that houses a ferrule; a mounting member that attaches to a board the housing movably in a direction perpendicular to a connector insertion and removal direction; and an elastic member arranged between the mounting member and the housing, wherein the housing is held in the mounting member via the elastic member, with a space ensured between a peripheral surface of the housing and the mounting member. According to such an optical connector, the housing becoming biased in respect to the floating range can be suppressed.

The elastic member may be arranged to a side in a vertical direction when seen from the housing. In this way, the housing is not placed in a position biased to the lower side in respect to the floating range due to influence of force of gravity and the like.

Another elastic member may be arranged between the housing and the mounting member to a side in a direction that intersects the vertical direction when seen from the housing. In this way, relative misalignment in two-dimensional direction can be absorbed.

A pair of the elastic members arranged between the housing and the mounting member may sandwich the housing in a direction perpendicular to the connector insertion and removal direction. In this way, the housing is placed in a neutral position in respect to the floating range.

The housing may be held in the mounting member via the elastic member to have elasticity in respect to a movement in a direction of rotation with the connector insertion and removal direction as an axis. In this way, relative misalignment in the direction of rotation can be absorbed.

The elastic member may be configured as a leaf spring that is wide, and one end of the leaf spring may be in contact with the housing, and another end of the leaf spring may be in contact with the mounting member. In this way, the housing being held such as to have elasticity in respect to movement in the direction of rotation can be realized.

One end part of the one end and the other end of the leaf spring may be a fixed end, and an end part to an opposite side may be a free end. In this way, the elastic member is easily deformed.

The mounting member may be a rectangular tube member surrounding the housing, and one side surface of the rectangular tube mounting member may be fixed to the board having a board surface parallel to the connector insertion and removal direction. In this way, the housing that houses the ferrules can be placed floatably perpendicular to the connector insertion and removal direction, in respect to the board that has a board surface parallel to the connector insertion and removal direction.

The mounting member may have a positioning pin that is fitted in a positioning hole of the board. In this way, the mounting member can be aligned in respect to the board.

The positioning pin may have a screw part to screw the mounting member to the board. In this way, even when the surface to the board side of the mounting member 5 is small, the mounting member can be positioned and screwed in respect to the board.

<Basic Configuration of Optical Connector>

Figure 2:
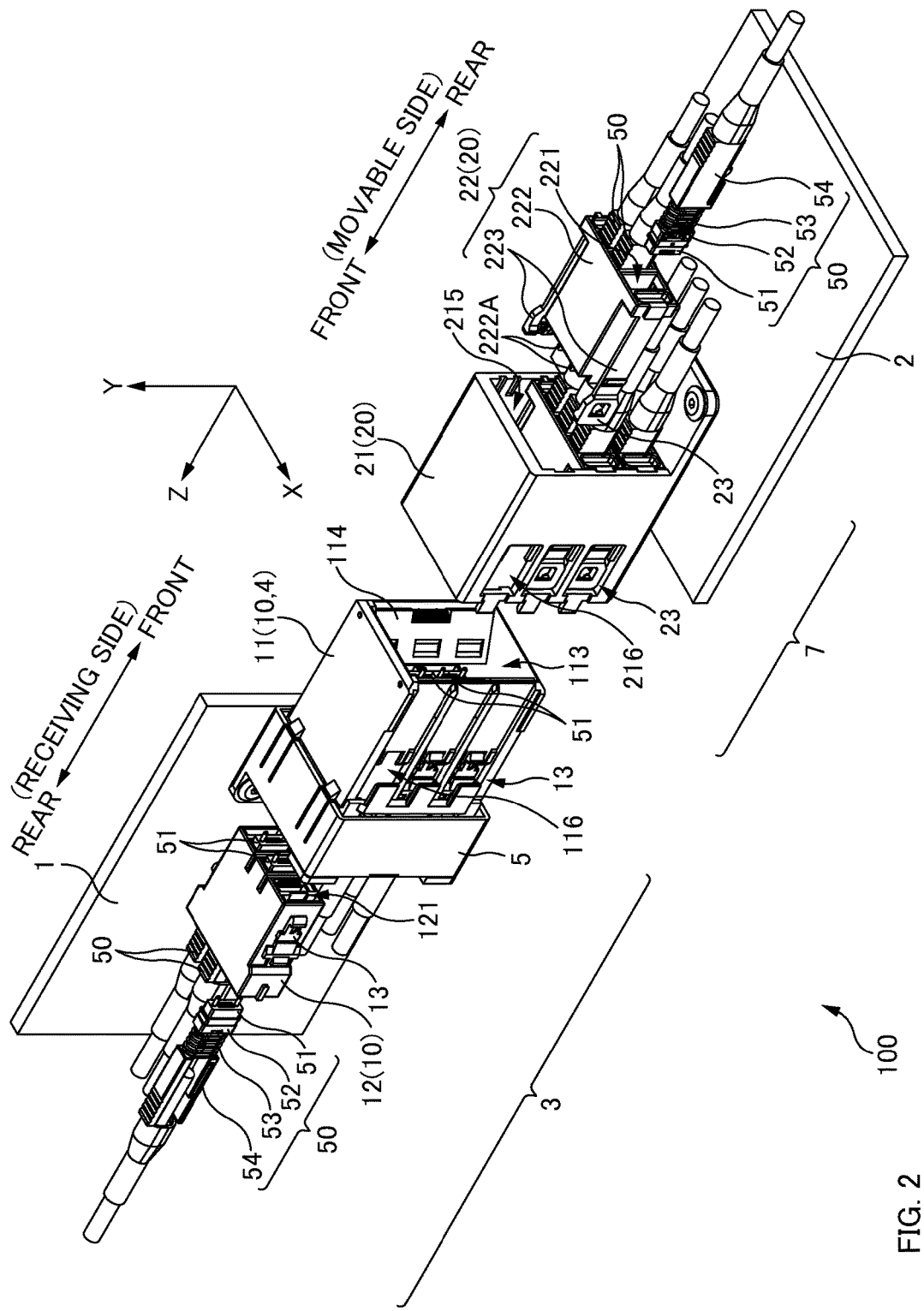
FIG. 2 is an exploded perspective view of an optical connector system 100 according to one or more embodiments.
Figure 3A:
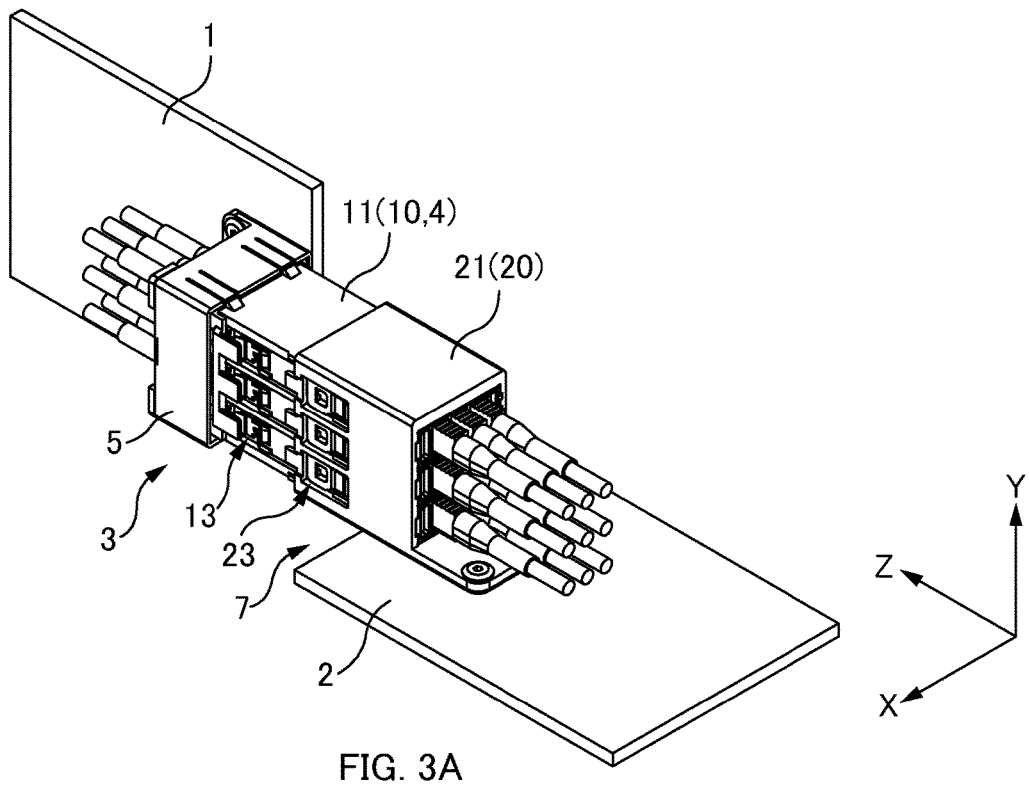
FIG. 3A and FIG. 3B are explanatory views showing the state when connectors are connected according to one or more embodiments.
Figure 3B:
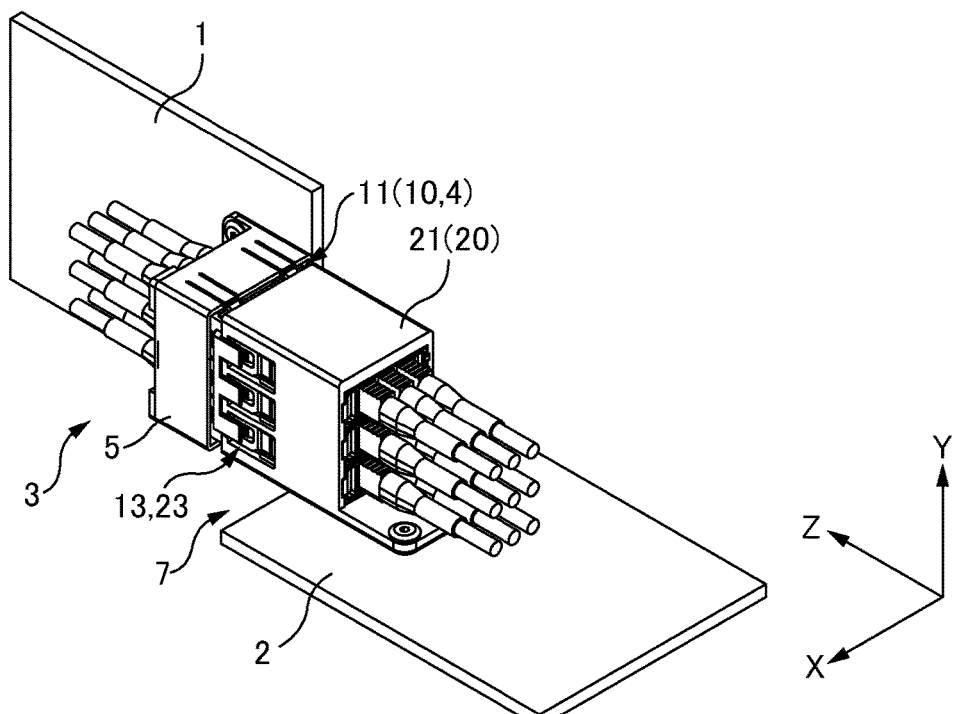

FIG. 1 is a perspective view of an optical connector system 100 in an initial position before connectors are connected. FIG. 2 is an exploded perspective view of an optical connector system 100. FIG. 3A and FIG. 3B are explanatory views showing the state when connectors are connected.

The optical connector system 100 of one or more embodiments has a receiving side optical connector 3 (first optical connector) and a movable side optical connector 7 (second optical connector). Here, the receiving side optical connector 3 is attached to a middle plane 1 (first board) of a plug-in unit (not shown). The board to attach the receiving side optical connector 3, however, is not limited to the middle plane 1, and may be other boards (for example, backplane and the like). Further, here the movable side optical connector 7 is attached to a printed board 2 (second board) that is inserted and removed along guide grooves (not shown) of the plug-in unit. The board to attach the movable side optical connector 7, however, is not limited to the printed board 2.

In the below description, as shown in FIG. 1 each direction is defined. In other words, a connector insertion and removal direction (direction of attaching/detaching) is referred to as a "Z direction". The Z direction is referred to as a "front-rear direction", and a side of an optical connector to the other side when seen from each optical connector is sometimes referred to as "front", and an opposite side is sometimes referred to as "rear". A direction perpendicular to a board surface of the printed board 2 is referred to as a "Y direction", and a direction perpendicular to the Y direction and the Z direction is referred to as an "X direction". In one or more embodiments, the Y direction is the vertical direction. A lower side in the vertical direction is sometimes referred to as "down".

Configuration of Receiving Side Optical Connector 3

The receiving side optical connector 3 has an optical connector body 4 and a mounting member 5. The optical connector body 4 is attached to the middle plane 1 via the mounting member 5. The middle plane 1 has a board surface parallel to a YZ plane. The optical connector body 4 is attached movably (floatably) in the XY direction to the mounting member 5 (or middle plane 1) (described later: refer to FIG. 6).

The optical connector body 4 has a receiving side housing 10 (first housing) and optical modules 50.

The receiving side housing 10 is a member to house ferrules 51 (refer to FIG. 2: ferrules 51 of optical modules 50). The receiving side housing 10 has an outer housing 11 and an inner housing 12. The receiving side housing 10 has a receiving side connecting mechanism 13, and the outer housing 11 and the inner housing 12 each is formed with a region that configures the receiving side connecting mechanism 13. The receiving side housing 10, however, does not have to be configured with two members (the outer housing 11 and the inner housing 12), but may be configured with one member.

The outer housing 11 is a member that houses the inner housing 12. The outer housing 11 is configured as a rectangular tube shape and in the inside space houses the inner housing 12. A rear part of the outer housing 11 is attached to the mounting member 5, and a front part of the outer housing 11 protrudes to the front side than the mounting member 5 and a front edge of the middle plane 1. A front side opening 113 of the outer housing 11 is an insertion opening to insert optical modules 50 of the movable side optical connector 7.

An openable and closable shutter 114 is provided in the front side opening 113 of the outer housing 11. As shown in FIG. 1, the shutter 114 is configured to close with a spring before the connector is connected, and when connector is connected is pushed and opened with the movable side connector. In FIG. 2, the shutter 114 is shown in a slightly open state for explanation. Here, the outer housing 11 has two shutters 114 that are double doors. By providing the two shutters 114 that are double doors, compared to the case of configuring one shutter 114 to open to one side, the dimension of the outer housing 11 in the front-rear direction can be made short. The outer housing 11, however, does not have to include the shutter 114.

A rear side opening (not shown) of the outer housing 11 is amounting opening to attach the inner housing 12. In other words, the outer housing 11 has a housing mounting part (not shown) to attach the inner housing 12. The outer housing 11 is attached with a plurality of (here, 3) the inner housings 12 aligned in the Y direction. The number of the inner housings 12 attached to the outer housing 11, however, may be one, or may be another number. The plurality of the inner housings 12 may be arranged aligned in the X direction The inner housing 12 is a member to house the optical modules 50 and is a member to attach the optical modules 50 to the outer housing 11. The inner housing 12 is housed inside the outer housing 11. Here, the inner housing 12 is housed movably in the Z direction in respect to the outer housing 11. By making use that the inner housing 12 is movable in the Z direction in respect to the outer housing 11, the receiving side connecting mechanism 13 and a movable side connecting mechanism 23 are configured detachably and attachably. The inner housing 12, however, may be fixed to the outer housing 11.

The inner housing 12 has module mounting parts 121 to mount the optical modules 50. The inner housing 12 has a plurality of (here, 3) the module mounting parts 121 and can mount the plurality of the optical modules 50 aligned in the X direction. When the optical modules 50 are mounted to the module mounting parts 121, endfaces of the ferrules 51 of the optical modules 50 are arranged protruding from a front endface of the inner housing 12 (refer to FIG. 2). A protrusion (not shown) is provided on an inner wall surface of the module mounting part 121, and the protrusion contacts a brim part (flange section) of the ferrules 51 to prevent the ferrules 51 from falling out forward.

The receiving side connecting mechanism 13 is formed on a side surface of the inner housing 12. The receiving side connecting mechanism 13 of the inner housing 12 is exposed from a side surface opening 116 formed on a side surface of the outer housing 11, and is configured connectably to the movable side connecting mechanism 23 of the movable side optical connector 7.

The optical module 50 is a module attached to an end of an optical fiber (including an optical fiber configuring such as an optical fiber tape, an optical cable, an optical cord). The optical module 50 has the ferrule 51, a pin clamp 52, a spring 53, and a spring push 54. The ferrule 51 is a member that holds an end part of the optical fiber. A brim part of the ferrule 51 protrudes outward from a peripheral surface of the ferrule 51 body, and contacts the protrusion (not shown) formed to the inner wall surface of the module mounting part 121 of the inner housing 12. The ferrule 51 is housed in the inner housing 12 retractably in the state pressed to the front side. Specifically, when the optical module 50 is attached to the inner housing 12 by catching the spring push 54 to the module mounting part 121 of the inner housing 12, the spring 53 is in the state compressed and deformed between the pin clamp 52 and the spring push 54, and with the elastic force of the spring 53 the ferrule 51 is in the state pressed to the front side, with the brim part made to contact the protrusion (not shown) on the inner wall surface of the module mounting part 121.

Configuration of Movable side optical connector 7

The movable side optical connector 7 is attached to the printed board 2. The printed board 2 has a board surface parallel to an XZ plane and is movable along the Z direction. The movable side optical connector 7 moves in the Z direction with the printed board 2.

The movable side optical connector 7 has a movable side housing 20 (second housing) and the optical modules 50.

The movable side housing 20 is a member to house the optical modules 50. The movable side housing 20 has an outer housing 21, and an inner housing 22. The movable side housing 20 has the movable side connecting mechanism 23, and the outer housing 21 and the inner housing 22 is each formed with a region configuring the movable side connecting mechanism 23.

The outer housing 21 is a member to house the inner housing 22. The outer housing 21 is configured as a rectangular tube shape, and in the inside space houses the inner housing 22. A rear part of the outer housing 21 is attached to the printed board 2, and a front part of the outer housing 21 protrudes to the front side than a front edge of the printed board 2. A front side opening (not shown) of the outer housing 21 is an insertion opening to insert the front part of the outer housing 11 of the receiving side optical connector 3 (refer to FIG. 3A).

A rear side opening 215 of the outer housing 21 is a mounting opening to attach the inner housing 22. In other words, the outer housing 21 has a housing mounting part to attach the inner housing 22. The outer housing 21 is attached with a plurality of (here, 3) inner housings 22 aligned in the Y direction. The number of the inner housing 22 attached to the outer housing 21, however, may be one, or may be another number. The plurality of the inner housings 22 may be arranged aligned in the X direction.

The inner housing 22 is a member to house optical modules 50 and is a member to attach optical modules 50 to the outer housing 21. The inner housing 22 is housed inside the outer housing 21. The movable side inner housing 22 is fixed to the outer housing 21, different from the inner housing 12 of the receiving side optical connector 3, and does not move in the Z direction in respect to the outer housing 21. The inner housing 22, however, may be configured movably in Z direction in respect to the outer housing 21, similar to the receiving side optical connector 3.

The inner housing 22 has module mounting parts 221 to mount the optical modules 50. Similar to the receiving side optical connector 3, the inner housing 22 has a plurality of (here, 3) the module mounting parts 221, and can mount the plurality of the optical module 50 aligned in the X direction. Similar to the receiving side optical connector 3, an inner wall surface of a module mounting part 221 is provided with a protrusion (not shown) that contacts the brim part (flange section) of the ferrule 51 to prevent the ferrule 51 from falling out forward.

The inner housing 22 has an insertion part 222 and a pair of arm parts 223.

The insertion part 222 is a region to be inserted inside the outer housing 11 of the receiving side optical connector 3. The insertion part 222 is arranged between the pair of arm parts 223, and there is a space between the insertion part 222 and the arm part 223. When the connectors are connected, a side plate (and shutter 114) of the outer housing 21 is arranged in the space between the insertion part 222 and the arm part 223 (refer to FIG. 3A and FIG. 3B). The insertion part 222 is formed with the module mounting part 221. When the optical modules 50 are mounted to the module mounting part 221, endfaces of the ferrules 51 of the optical modules 50 are arranged protruding from the front endface of the insertion part 222. When connectors are connected, the optical modules 50 of the movable side optical connector 7 are inserted from a front side opening 113 of the receiving side housing 10 together with the insertion part 222. The front endface of the insertion part 222 is formed with protrusions 222A to push and open the shutter 114.

The arm part 223 is a region to fix the inner housing 22 to the outer housing 21. The movable side connecting mechanism 23 is formed to an outer side surface of the arm part 223. The movable side connecting mechanism 23 of the inner housing 22 formed to the arm part 223 is configured to be exposed from a side surface opening 216 formed in the side surface of the outer housing 21, and is configured connectably to the receiving side connecting mechanism 13 of the receiving side optical connector 3.

The optical module 50 is a module attached to an end of an optical fiber. The optical module 50 has a configuration similar to the optical module 50 of the receiving side optical connector 3, and has a ferrule 51, a pin clamp 52, a spring 53, and a spring push 54. Similar to the receiving side optical connector 3, the ferrule 51 is housed in the inner housing 22 retractably in the state pressed to the front side.

When Connector is Connected

As shown in FIG. 3A, when the printed board 2 is moved toward the middle plane 1 along guide grooves (not shown) of the plug-in unit, the receiving side housing 10 and the movable side housing 20 come into contact, to perform aligning of the receiving side optical connector 3 and the movable side optical connector 7. Specifically, as shown in FIG. 3A, the rectangular tube shaped outer housing 11 of the receiving side housing 10 enters inside the rectangular tube shaped outer housing 21 of the movable side optical connector 7, the peripheral surface of the outer housing 11 of the receiving side optical connector 3 and the inner peripheral surface of the outer housing 21 of the movable side optical connector 7 come into contact, the receiving side housing 10 and the movable side housing 20 are fitted, to align the relative position in the X direction and the Y direction with the outer housing 21 of the movable side optical connector 7.

In the stage shown in FIG. 3A, the ferrules 51 of the receiving side optical connector 3 and the ferrules 51 of the movable side optical connector 7 are not in contact. In other words, before the ferrules 51 of the receiving side optical connector 3 and the ferrules 51 of the movable side optical connector 7 come into contact, the receiving side housing 10 and the movable side housing 20 are fitted, to align the receiving side optical connector 3 and the movable side optical connector 7.

When the receiving side housing 10 and the movable side housing 20 come into contact, the shutter 114 of the receiving side optical connector 3 is pushed and opened with protrusions 222A of an insertion part 222 of the movable side optical connector 7 (refer to FIG. 2). When the receiving side housing 10 and the movable side housing 20 are fitted, the outer housing 21 of the movable side optical connector 7 and the arm part 223 of the inner housing 22 become the outside of the outer housing 11 of the receiving side optical connector 3, and the insertion part 222 (and optical module 50) of the inner housing 22 of the movable side optical connector 7 is inserted inside the receiving side optical connector 3 of the outer housing 11.

When the printed board 2 is moved further toward the middle plane 1 from the state shown in FIG. 3A, the receiving side connecting mechanism 13 and the movable side connecting mechanism 23 are connected, as shown in FIG. 3B. At this time, positioning pins of the ferrules 51 of the receiving side optical connector 3 fit positioning holes (not shown) of the ferrules 51 of the movable side optical connector 7 to align the ferrules 51 with each other, and the endfaces of the ferrules 51 are butted against each other.

By the way, to fit the positioning pins of the ferrules 51 of the receiving side optical connector 3 with the positioning holes (not shown) of the ferrules 51 of the movable side optical connector 7, relative positions of the ferrules 51 with each other need to be made highly accurate in advance (for example, misalignment in the XY direction is to be made in a range of approximately equal to or smaller than 0.4 mm).

On the other hand, it is difficult to make the receiving side optical connector 3 and the movable side optical connector 7 such that relative positions of the ferrules 51 with each other will be highly accurate in the initial stage shown in FIG. 1. In one or more embodiments, the receiving side housing 10 and the movable side housing 20 are fitted before the ferrules 51 come into contact with each other, to alleviate the misalignment of relative positions of the ferrules 51 with each other in the initial stage. In this way, in the initial stage of FIG. 1, the relative misalignment between the receiving side optical connector 3 and the movable side optical connector 7 (misalignment in the X direction and the Y direction) is allowed up to approximately 2.5 mm.

<Floating Mechanism>

In one or more embodiments, in order to be able to alleviate relative misalignment between the ferrules 51 in the initial stage, when fitting the receiving side housing 10 and the movable side housing 20, the receiving side housing 10 is configured movably (floatably) in the XY direction in respect to the mounting member 5. In other words, by configuring the receiving side housing 10 movably (floatably) in the XY direction in respect to the mounting member 5, when fitting the receiving side housing 10 and the movable side housing 20, the optical connector body 4 of the receiving side optical connector 3 moves in respect to the mounting member 5 (middle plane 1) according to the position of the movable side optical connector 7, and in this way the relative misalignment of the ferrules 51 with each other in the initial stage is alleviated.

Figure 4A:
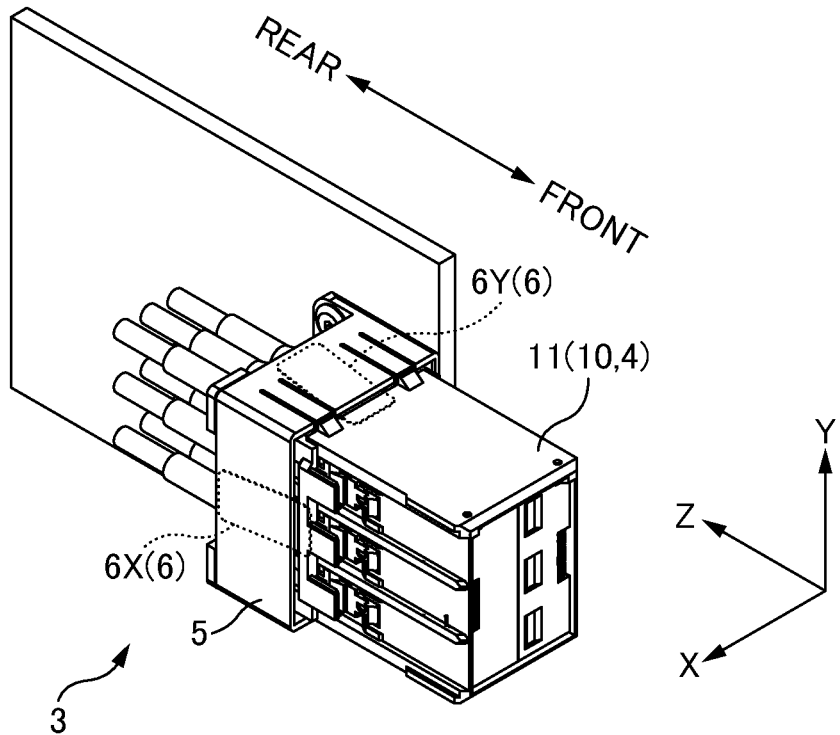
FIG. 4A is an explanatory view of elastic members 6 according to one or more embodiments.
Figure 4B:
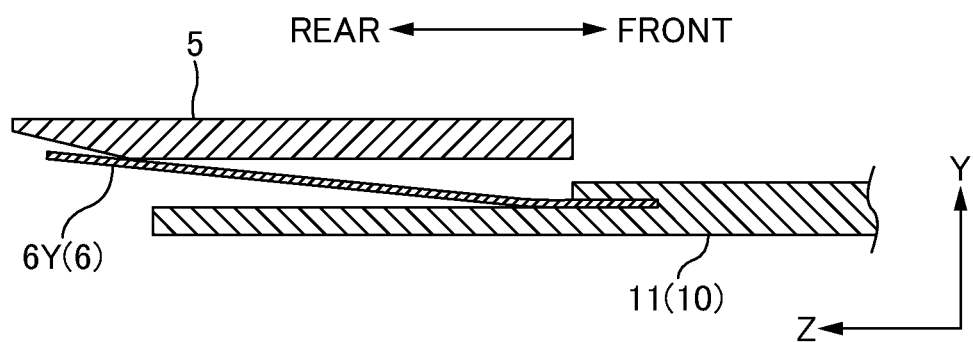
FIG. 4B is a cross-sectional view of a periphery of an elastic member 6 according to one or more embodiments.
Figure 5:
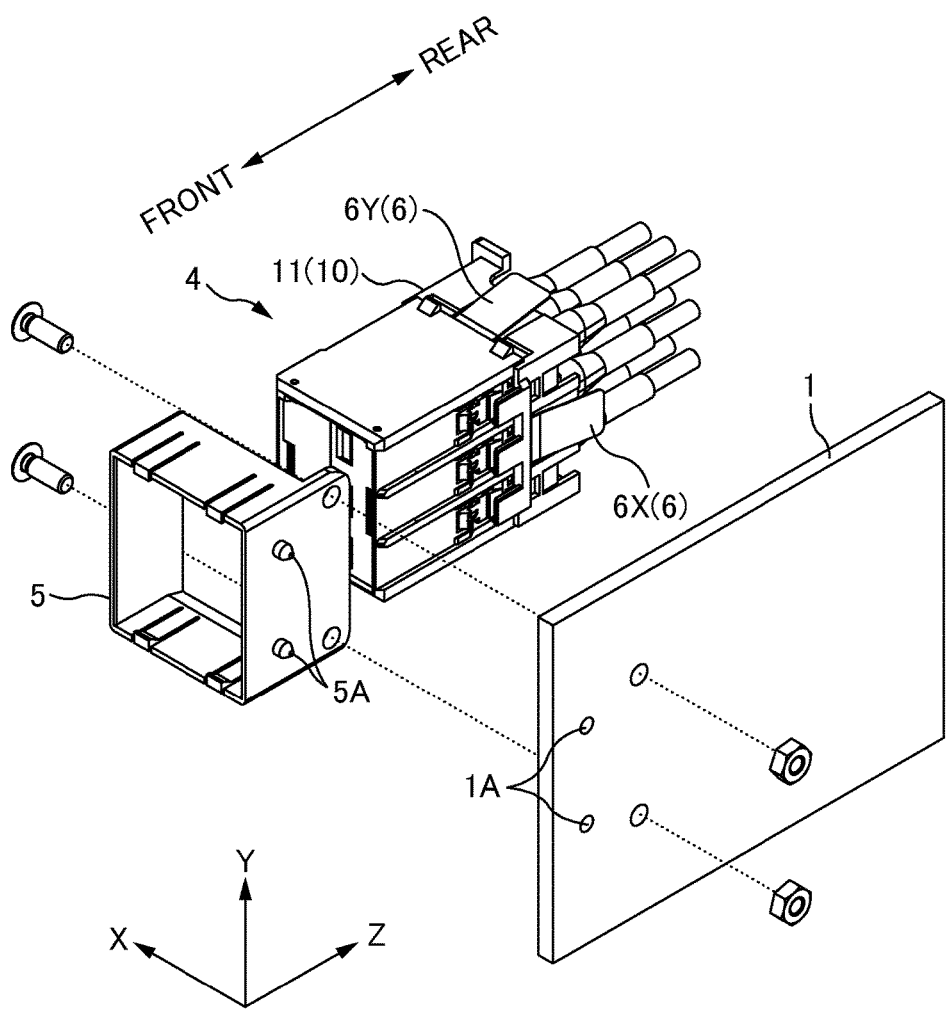
FIG. 5 is an exploded perspective view showing elastic members 6 according to one or more embodiments.
Figure 6:
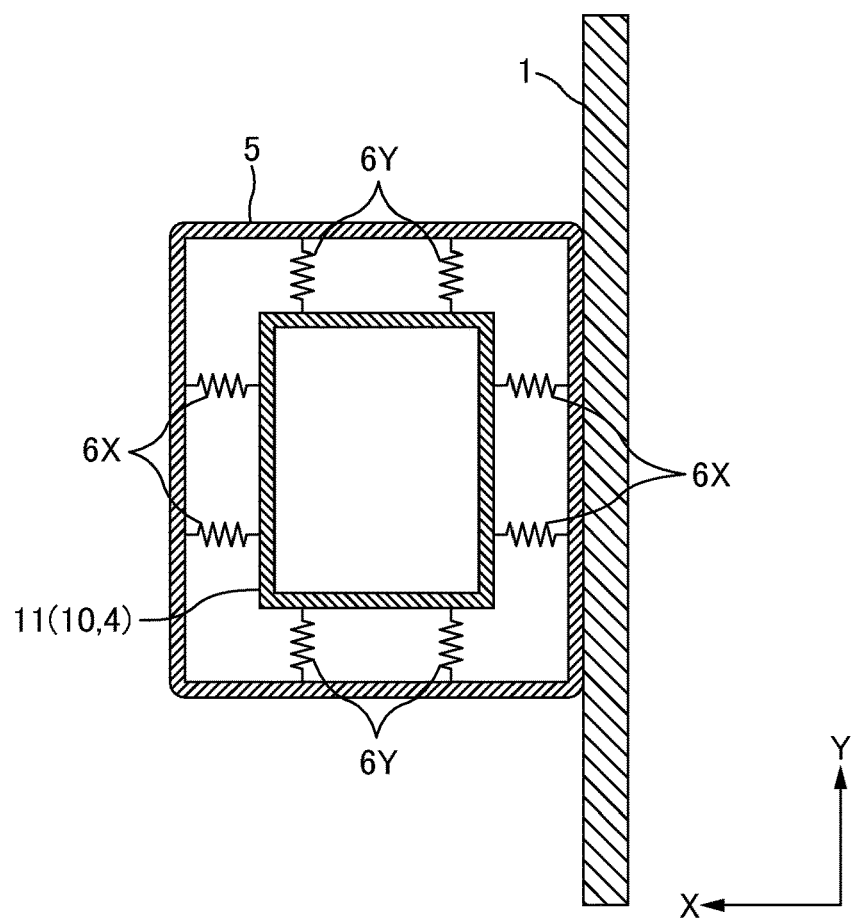
FIG. 6 is a schematic drawing showing functions of elastic members 6 according to one or more embodiments.

FIG. 4A is an explanatory view of elastic members 6. FIG. 4B is a cross-sectional view showing a periphery of an elastic member 6. FIG. 5 is an exploded perspective view showing elastic members 6. FIG. 6 is a schematic drawing showing functions of elastic members 6.

The mounting member 5 is a member to attach the receiving side housing 10 to the middle plane 1 movably in the XY direction in respect to the middle plane 1. Because the receiving side housing 10 is attached movably in the XY direction, the optical connector body 4 is movable in the XY direction. The mounting member 5 is configured as a rectangular tube shape, and in the inside space houses the receiving side housing 10 (in detail, rear part of outer housing 11). In other words, the receiving side housing 10 (in detail, rear part of outer housing 11) is surrounded with the mounting member 5. The mounting member 5 is screwed and fixed to the middle plane 1 in one side surface of the rectangular tube shaped mounting member 5.

A space is ensured between the inner peripheral surface of the rectangular tube shaped mounting member 5 and the peripheral surface of the receiving side housing 10 (in detail, rear part of outer housing 11), and in this way a floating range of the receiving side housing 10 (optical connector body 4) in respect to the mounting member 5 is set.

Positioning pins 5A (positioning parts) are formed on a bottom surface of the mounting member 5 (surface to the side of middle plane 1). A pair of the positioning pins 5A is formed aligned in the Y direction. The mounting member 5 is fixed to the middle plane 1 with the positioning pins 5A fitted in positioning holes 1A (positioning parts) of the middle plane 1.

The elastic members 6 are arranged between the mounting member 5 and the receiving side housing 10 (in detail, outer housing 11). In one or more embodiments the receiving side housing 10 is held in the mounting member 5 via the elastic members 6, with a space ensured between the peripheral surface of the receiving side housing 10 and the inner peripheral surface of the mounting member 5. In this way, the receiving side housing 10 being arranged biased in respect to the floating range can be suppressed.

By the way, supposing there are no elastic members 6, for example, due to influence of a force of gravity or the like the receiving side housing 10 will be in a state contacting the mounting member 5 (the receiving side housing 10 will be in a state closer to a lower side in the floating range). In this way in the case that the receiving side housing 10 is in a state biased in respect to the floating range, because the receiving side housing 10 cannot be moved to the lower side when fitted with the movable side optical connector 7, fitting with the movable side optical connector 7 is degraded. Further, in the case that the receiving side housing 10 is in a state biased in respect to the floating range, misalignment (dimension tolerance or the like) between the receiving side optical connector 3 and the movable side optical connector 7 which causes the receiving side housing 10 to move to the lower side cannot be allowed, and thus would be a design restriction for the receiving side optical connector 3 and the movable side optical connector 7. On the contrary, in one or more embodiments, with the receiving side housing 10 being held in the mounting member 5 via the elastic members 6, a space is ensured between the peripheral surface of the receiving side housing 10 and the inner peripheral surface of the mounting member 5, thus such an issue does not arise.

In one or more embodiments, the Y direction is the vertical direction, and Y direction elastic members 6Y are arranged to the side in the vertical direction (Y direction) when seen from the receiving side housing 10. With the Y direction elastic members 6Y, the receiving side housing 10 being arranged biased to the lower side in respect to the floating range due to the influence of the force of gravity can be suppressed.

In one or more embodiments, not only are the Y direction elastic members 6Y arranged to the side in the Y direction when seen from the receiving side housing 10, but also X direction elastic members 6X are arranged to the side in the X direction when seen from the receiving side housing 10. In other words, the elastic members 6 are arranged in each of the XY directions when seen from the receiving side housing 10. In this way, relative misalignment between the receiving side optical connector 3 and the movable side optical connector 7 in a direction perpendicular to the Z direction can be allowed. Further, by providing the Y direction elastic members 6Y and the X direction elastic members 6X, there is an advantage that the receiving side housing 10 can be held in respect to the mounting member 5, to have elasticity in respect to displacement in a direction of rotation.

In one or more embodiments, the pair of the Y direction elastic members 6Y is each arranged between the mounting member 5 and the receiving side housing 10, such that the receiving side housing 10 is sandwiched in the Y direction. Further, the pair of the X direction elastic members 6X is each arranged between the mounting member 5 and the receiving side housing 10 (in detail, outer housing 11), such that the receiving side housing 10 is sandwiched in the X direction. In this way, by arranging the pair of the elastic members 6 between the mounting member 5 and the receiving side housing 10, such as to sandwich the receiving side housing 10 in the direction perpendicular to the Z direction, the receiving side housing 10 can be placed in a neutral position in respect to the floating range.

In one or more embodiments, the elastic members 6 are configured as leaf springs that are wide. For example, as shown in FIG. 5, the Y direction elastic member 6Y is configured as a leaf spring that is wide in the X direction, and the X direction elastic member 6X is configured as a leaf spring that is wide in the Y direction. In one or more embodiments, one end of the leaf spring that is wide in this way contacts the optical connector body 4 (in detail, outer housing 11), and another end contacts the mounting member 5. In this way, each leaf spring will have elasticity in the width direction. For example, the Y direction elastic member 6Y has elasticity in the X direction which is the width direction. In this way, in FIG. 6 which is a schematic drawing, one leaf spring is shown as two spring elements with an interval in between. For example, the Y direction elastic members 6Y are shown as two spring elements with an interval in between in the X direction, and the X direction elastic members 6X are shown as two spring elements with an interval in between in the Y direction.

By each elastic member 6 having elasticity in the width direction, the receiving side housing 10 being held in respect to the mounting member 5, to have elasticity in respect to displacement in the direction of rotation, can be realized. In this way, because the receiving side housing 10 is allowed to move in the direction of rotation about the Z axis in respect to the mounting member 5, supposing that in the initial stage the relative positional relation between the receiving side optical connector 3 and the movable side optical connector 7 is displaced about the Z axis, the misalignment can be absorbed when the connector is connected. Further, after the movable side optical connector 7 is extracted, the receiving side housing 10 can move back to the initial position in respect to the mounting member 5. It should be noted that, the receiving side housing 10 can be movably held in the direction of rotation about the Z axis with an elastic member 6 other than the leaf spring. The elastic member 6 may be a member other than the leaf spring and may be a plate spring or a coil spring.

Further, in one or more embodiments, the leaf spring is configured as a cantilever shape, and a front side end part is fixed to the outer housing 11 to be a fixed end, and a rear side end part is a free end that contacts the inner peripheral surface of the mounting member 5 (refer to FIG. 4B, FIG. 5). By fixing one of the end part of the leaf spring to the outer housing 11 (or the mounting member 5), the elastic member 6 can be prevented from becoming misaligned. Further, by making the opposite side end part of the leaf spring a free end, the end part of the leaf spring to the side of the free end becomes slidable, and the elastic member 6 is easily deformed, and the outer housing 11 easily moves in respect to the mounting member 5. It should be noted that, one end of the elastic member 6 may be fixed to the mounting member 5, and the end part to the outer housing 11 side may be a free end. Further, the leaf spring does not have to be a cantilever shape.

Figure 7A:
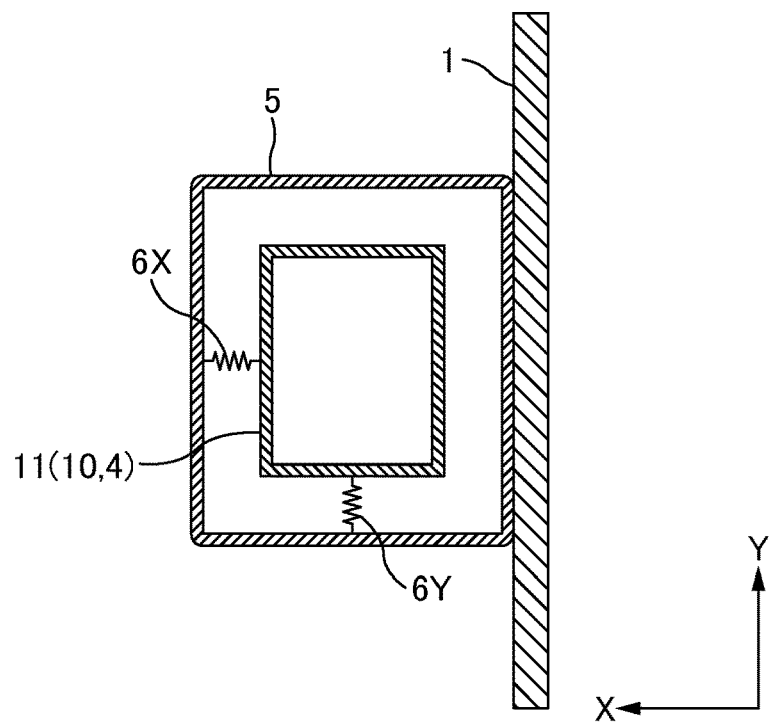
FIG. 7A is an explanatory view of elastic members 6 of a receiving side optical connector 3 according to one or more embodiments.

FIG. 7A is an explanatory view of an elastic member 6 of a receiving side optical connector 3 in one or more embodiments.

The receiving side optical connector 3 in one or more embodiments includes a receiving side housing 10 housing a ferrule 51, a mounting member 5 to attach the housing to the middle plane 1 movably in the XY direction, and an elastic member 6 arranged between the mounting member 5 and the receiving side housing 10. In one or more embodiments, however, the number and the arrangement of the elastic member 6 are different from those in one or more embodiments described above.

In one or more embodiments, one each of the Y direction elastic member 6Y and the X direction elastic member 6X is provided (in other words, the Y direction elastic member 6Y is provided to only one side in the Y direction seen from the receiving side housing 10, and the X direction elastic member 6X is provided to only one side in the X direction seen from the receiving side housing 10). In also one or more embodiments, the receiving side housing 10 is held in the mounting member 5 via the elastic members 6 with a space ensured between a peripheral surface of the receiving side housing 10 (in detail, rear part of outer housing 11) and an inner peripheral surface of the mounting member 5. In this way, the receiving side housing 10 being arranged biased in respect to the floating range can be suppressed.

Further, in one or more embodiments, each of the Y direction elastic member 6Y and the X direction elastic member 6X is provided. In this way, relative misalignment between the receiving side optical connector 3 and the movable side optical connector 7 in the direction perpendicular to the Z direction can be allowed. In addition, also in one or more embodiments, the receiving side housing 10 being held in respect to the mounting member 5 such as to have elasticity in respect to displacement in the direction of rotation can be realized.

It should be noted that, in one or more embodiments, a pair of elastic members 6 to sandwich the receiving side housing 10 is not arranged. Further, the elastic members 6 in one or more embodiments are configured not as a leaf spring that is wide but as another member (for example, coil spring and the like), and does not have elasticity in the width direction (thus, the Y direction elastic member 6Y and the X direction elastic member 6X are shown as one spring element in FIG. 7A which is a schematic drawing). With such a configuration, however, the receiving side housing 10 can be held in the mounting member 5 via the elastic member 6, with a space ensured between the peripheral surface of the receiving side housing 10 and an inner peripheral surface of the mounting member 5.

Figure 7B:
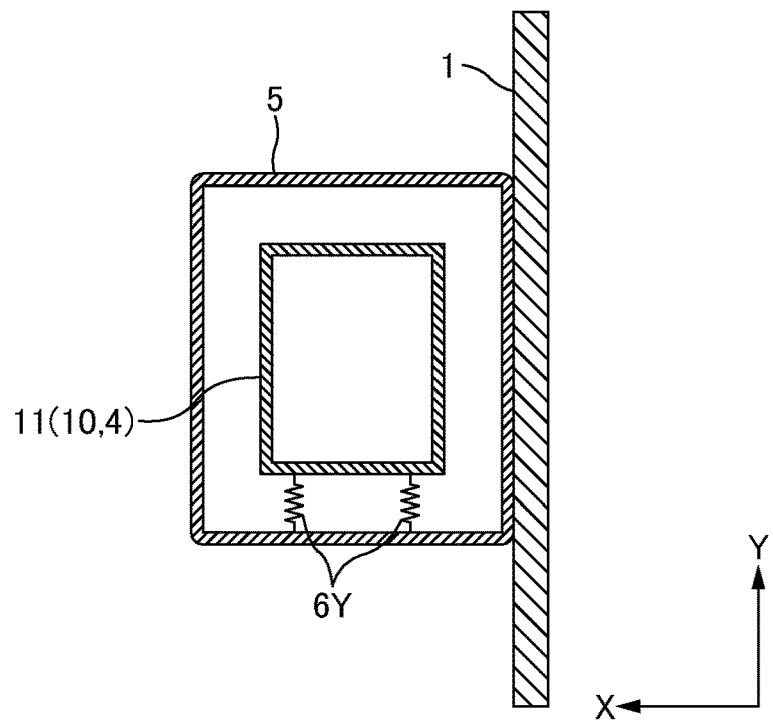
FIG. 7B is an explanatory view of elastic members 6 of a receiving side optical connector 3 according to one or more embodiments.

FIG. 7B is an explanatory view of elastic members 6 of a receiving side optical connector 3 in one or more embodiments. The receiving side optical connector 3 of includes a receiving side housing 10 that houses ferrules 51, a mounting member 5 to attach the housing to a middle plane 1 movably in the XY direction, and elastic members 6 arranged between the mounting member 5 and the receiving side housing 10.

In one or more embodiments, Y direction elastic members 6Y are provided to only one side (lower side of receiving side housing 10) in the Y direction seen from the receiving side housing 10. Thus, in one or more embodiments, a pair of the Y direction elastic members 6Y to sandwich the receiving side housing 10 in the Y direction is not provided. Further, in one or more embodiments, different from one or more embodiments described above, X direction elastic members 6X are not provided. In one or more embodiments, however, the Y direction elastic members 6Y are configured as leaf springs that are wide, and have elasticity in the X direction which is the width direction of the leaf spring (thus, in FIG. 7B which is a schematic drawing, the Y direction elastic member 6Y that is one leaf spring is shown as two spring elements aligned in the X direction). Also in one or more embodiments, the receiving side housing 10 is held in the mounting member 5 via the elastic members 6, with a space ensured between a peripheral surface of the receiving side housing 10 (in detail, rear part of outer housing 11) and an inner peripheral surface of the mounting member 5. In this way, the receiving side housing 10 being arranged biased in respect to the floating range can be suppressed.

Further, in one or more embodiments, because the Y direction elastic members 6Y have elasticity in the X direction (refer to FIG. 7B), the receiving side housing 10 being held in respect to the mounting member 5 to have elasticity in respect to displacement in the direction of rotation can be realized.

Figure 8A:
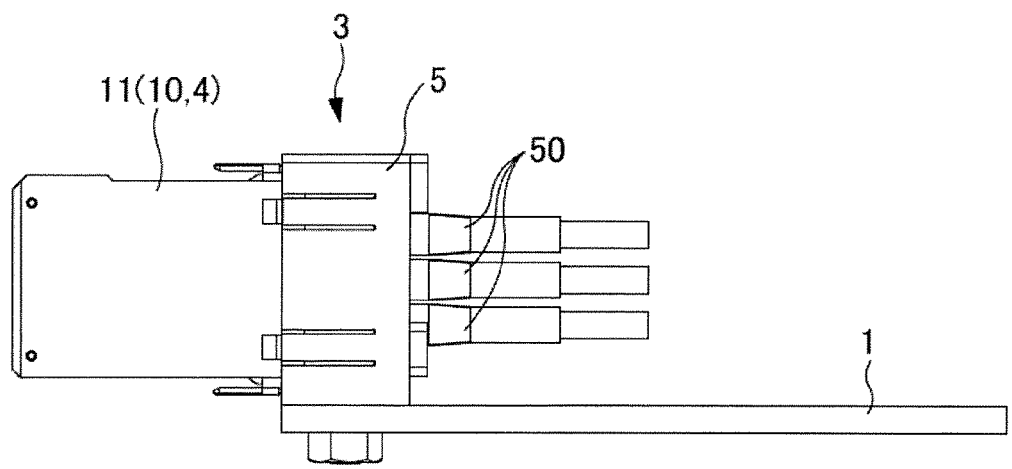
FIG. 8A is an explanatory view of a receiving side optical connector 3 according to one or more embodiments.
Figure 8B:
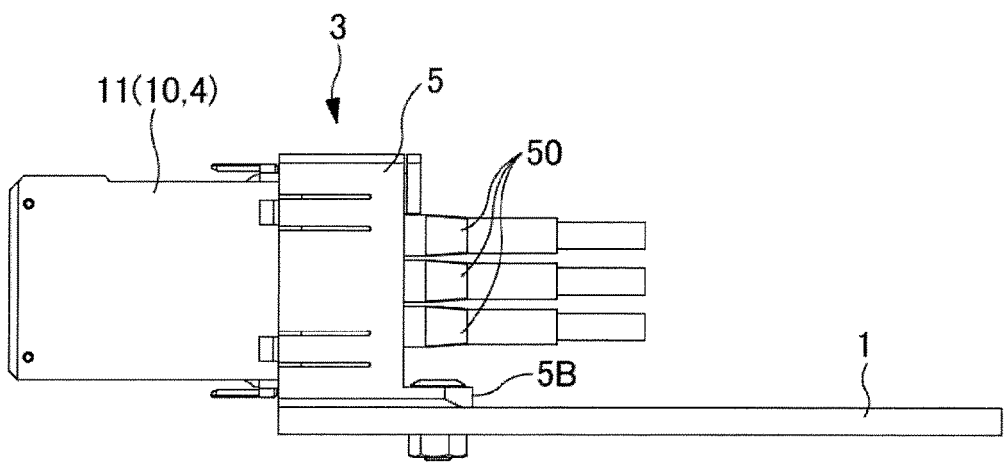
FIG. 8B is an explanatory view of a receiving side optical connector 3 as a reference example according to one or more embodiments.

FIG. 8A is an explanatory view of a receiving side optical connector 3 in one or more embodiments. FIG. 8B is an explanatory view of the receiving side optical connector 3 as a reference example.

In the reference example shown in FIG. 8B, a protruding plate part 5B protruding to the rear side from one side surface of a body part of a rectangular tube shaped mounting member 5 is formed, and the mounting member 5 is screwed and fixed to the middle plane 1 in this protruding plate part 5B. When such a protruding plate part 5B is provided, however, a surface of the middle plane 1 which can be wired becomes small. On the contrary, in one or more embodiments, a protruding plate part 5B is not formed on the mounting member 5, and the mounting member 5 is fixed to the middle plane 1 in a body part side surface of the rectangular tube shaped mounting member 5. In this way, in one or more embodiments, a surface of the middle plane 1 that can be wired can be made large.

Figure 9A:
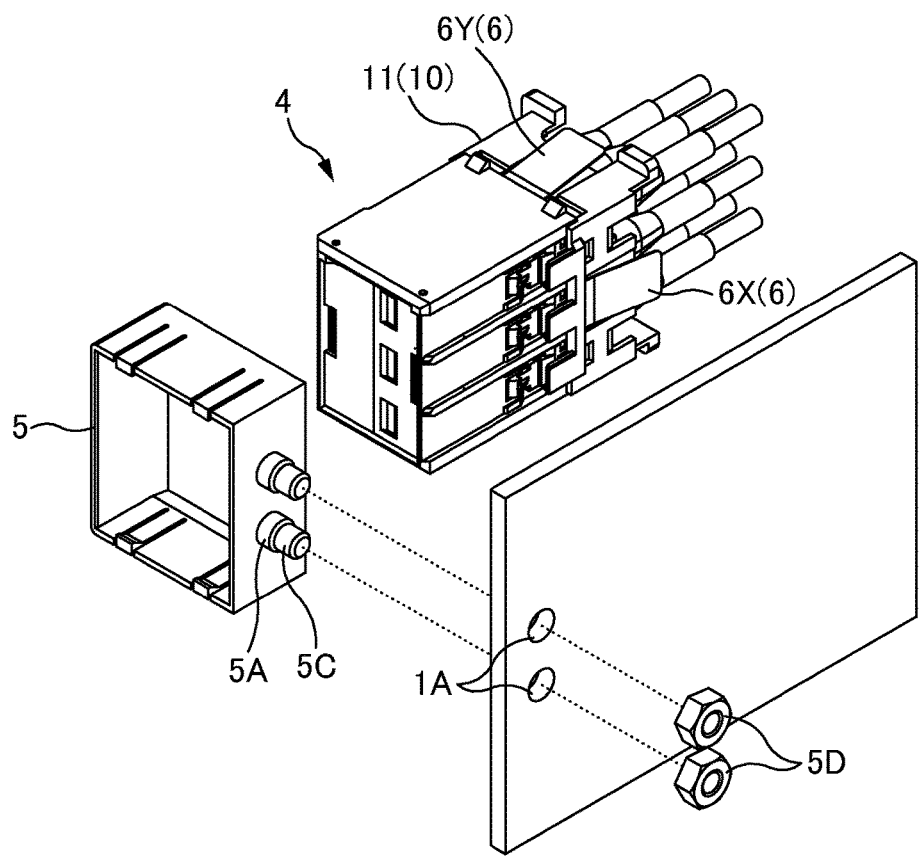
FIG. 9A is an exploded perspective view of a receiving side optical connector 3 according to one or more embodiments.

FIG. 9A is an exploded perspective view of the receiving side optical connector 3 in one or more embodiments. Also each of the pair of the Y direction elastic members 6Y is arranged between the mounting member 5 and the receiving side housing 10 to sandwich the receiving side housing 10 in the Y direction. Further, each of the pair of the X direction elastic members 6X is arranged, between the mounting member 5 and the receiving side housing 10 (in detail, outer housing 11) to sandwich the receiving side housing 10 in the X direction. Thus, also the pair of the elastic members 6 is arranged between the mounting member 5 and the receiving side housing 10, to sandwich the receiving side housing 10 in a direction perpendicular to the Z direction. In this way, the receiving side housing 10 can be placed in a neutral position in respect to the floating range.

A pair of positioning pins 5A (positioning parts) is formed in a bottom surface of the mounting member 5 (a surface to the middle plane 1 side). Because the mounting member 5 in one or more embodiments is not provided with the protruding plate part 5B as the reference example, the bottom surface of the mounting member 5 in one or more embodiments (a surface to the middle plane 1 side) has a small area, and it is difficult to separately provide each of a region to screw like the mounting member 5 in the reference example (refer to FIG. 5) and a region to form the positioning pins 5A. In one or more embodiments, the positioning pins 5A are formed with a male screw part 5C (screw part) to screw the mounting member 5.

Figure 9B:
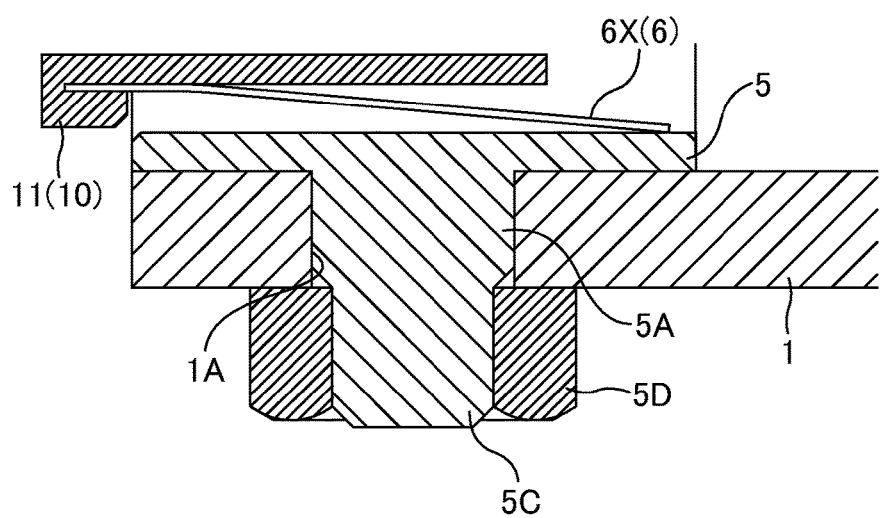
FIG. 9B is a cross-sectional view of a periphery of a positioning pin 5A according to one or more embodiments.

FIG. 9B is a cross-sectional view of a periphery of the positioning pin 5A in one or more embodiments. A male screw part 5C is formed to an end part of the positioning pin 5A. When the mounting member 5 is arranged on the middle plane 1, with the positioning pin 5A and the positioning hole 1A (positioning part) of the middle plane 1 being fitted, the male screw part 5C protrudes from a rear surface of the middle plane 1. Thus, when the male screw part 5C and a nut 5D are engaged, the mounting member 5 can be screwed and fixed while being positioned in respect to the middle plane 1. In this way, in one or more embodiments, by providing the screw part (male screw part 5C) to the positioning pin 5A of the mounting member 5, even when the area of the bottom surface (surface to the middle plane 1 side) of the mounting member 5 is small, the mounting member 5 can be positioned and screwed and fixed in respect to the middle plane 1.

Figure 10A:
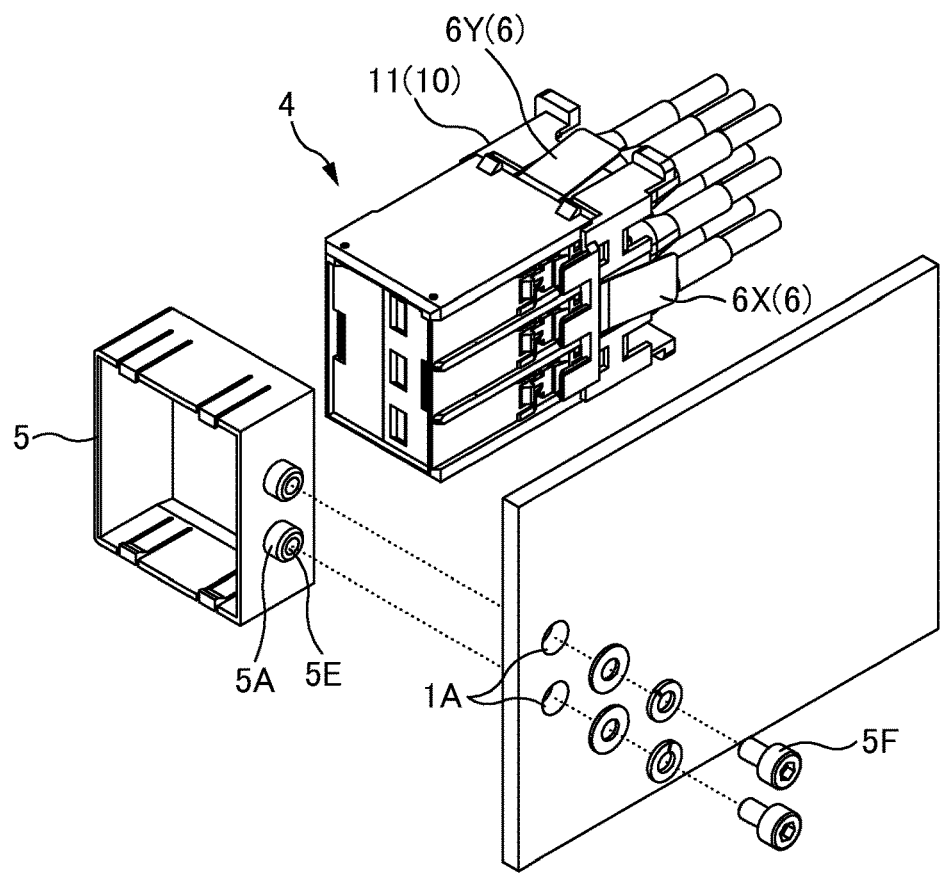
FIG. 10A is an exploded perspective view of a receiving side optical connector 3 of one or more embodiments.
Figure 10B:
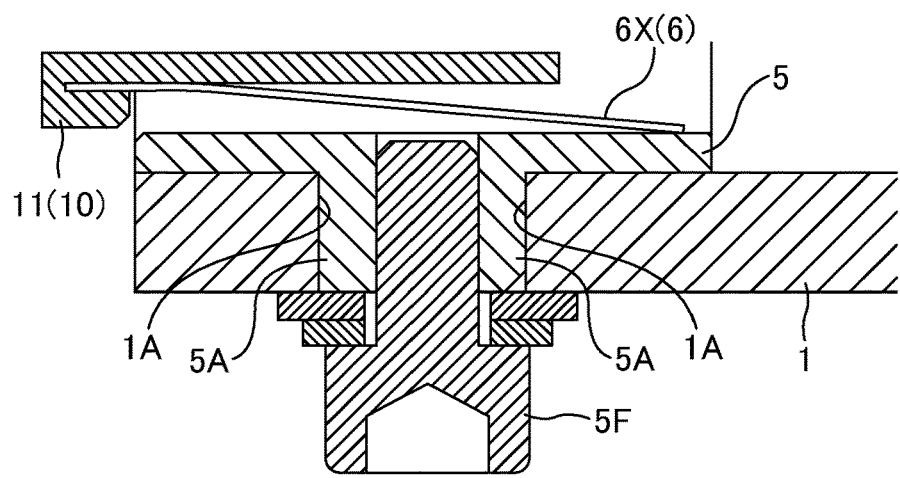
FIG. 10B is a cross-sectional view of a periphery of a positioning pin 5A in one or more embodiments.

FIG. 10A is an exploded perspective view of a receiving side optical connector 3 of a modified example according to one or more embodiments. FIG. 10B is a cross-sectional view of a periphery of the positioning pin 5A in the modified example. In the modified example, a female screw part 5E is formed to the positioning pin 5A. When a bolt 5F is engaged to a female screw part 5E from a rear surface side of the middle plane 1, while fitting the positioning pins 5A of the mounting member 5 with the positioning holes 1A (positioning parts) of the middle plane 1, the mounting member 5 can be positioned and screwed and fixed to the middle plane 1. Also in the modified example, by providing a screw part (female screw part 5E) to the positioning pin 5A of the mounting member 5, even when the area of the bottom surface (surface to middle plane 1 side) of the mounting member 5 is small, the mounting member 5 can be positioned and screwed and fixed to the middle plane 1.

It should be noted that, in the modified example, the bolt 5F is engaged via a plain washer and a spring washer. In this way, the mounting member 5 may be screwed and fixed with the washer intervened to the rear surface side of the middle plane 1.

Figure 11A:
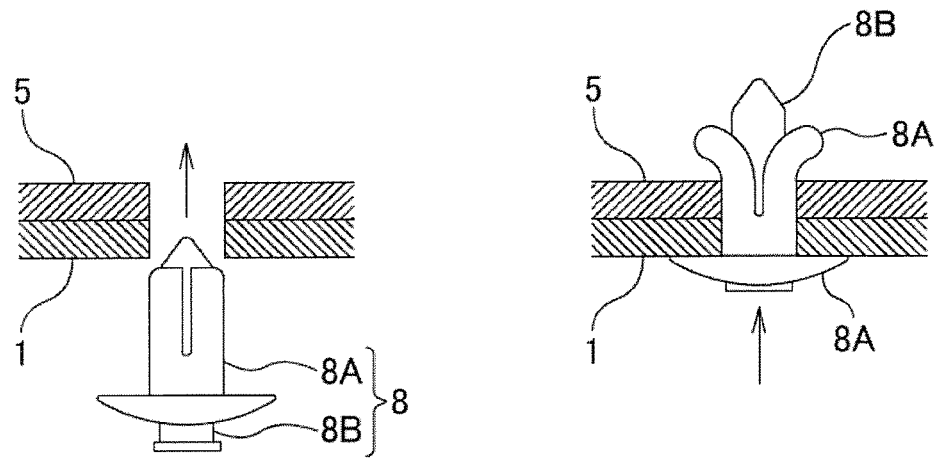
FIG. 11A is an explanatory view of a fixing method of a mounting member 5 according to one or more embodiments.

FIG. 11A is an explanatory view of a fixing method of a mounting member 5 in one or more embodiments. In one or more embodiments, the mounting member 5 is fixed to the middle plane 1 with a push rivet 8. In this way, the fixing method of the mounting member 5 is not limited to being screwed and may be other methods.

The push rivet 8 is a fixing member that has a grommet part 8A and a pusher pin 8B. A perforation for fixing is formed in advance in the mounting member 5 and the middle plane 1, and after the grommet part 8A is inserted through two holes, the pusher pin 8B is pushed in and an end part of the grommet part 8A opens. With the push rivet 8 in FIG. 11A, a head part of a grommet part 8A is formed in a washer shape, the mounting member 5 and the middle plane 1 are sandwiched between the open end part of the grommet part 8A and the washer shaped head part, to thus fix the mounting member 5 to the middle plane 1.

Figure 11B:
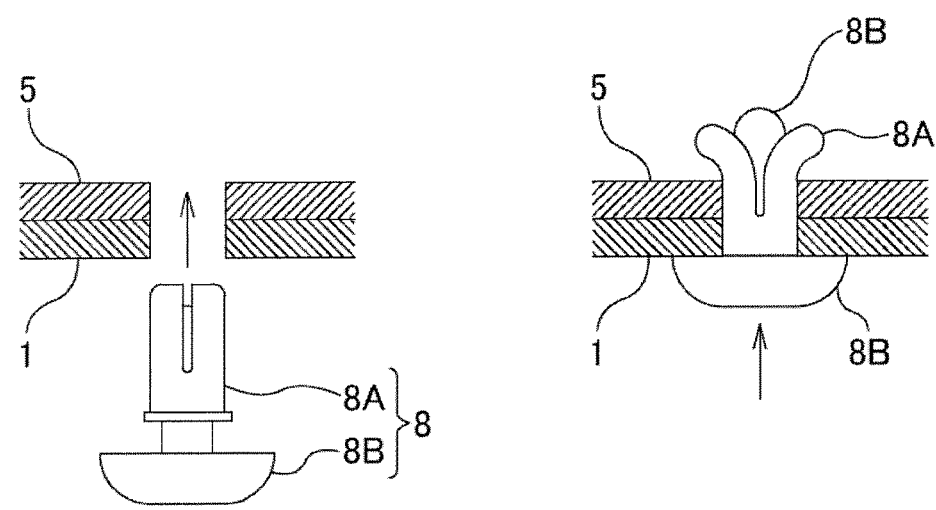
FIG. 11B is an explanatory view of one or more embodiments

FIG. 11B is an explanatory view of a modified example in accordance with one or more embodiments. With a push rivet 8 of the modified example, a head part of a pusher pin 8B is formed in a washer shape, and when the pusher pin 8B is pushed in, an end part of a grommet part 8A opens, and also the mounting member 5 and the middle plane 1 are sandwiched between the open end part of the grommet part 8A and the washer shaped head part of the pusher pin 8B, to fix the mounting member 5 to the middle plane 1.

As shown in FIG. 11A and FIG. 11B, when the push rivet 8 is used, a part of the push rivet 8 (for example, an open end part of the grommet part 8A) protrudes to the inside of the mounting member 5. As described above, because a space is ensured to arrange the elastic members 6 between the mounting member 5 and the receiving side housing 10, a part of the push rivet 8 that protrudes to the inside of the mounting member 5 (for example, an open end part of the grommet part 8A) may be arranged in this space.

Conclusion

The receiving side optical connector 3 (optical connector) in one or more embodiments includes a receiving side housing 10 (housing) housing the ferrules 51, the mounting member 5 to movably attach the housing in the XY direction (direction perpendicular to connector insertion and removal direction) in respect to the middle plane 1 (board), and the elastic members 6 arranged between the mounting member 5 and the receiving side housing 10. In one or more embodiments, the receiving side housing 10 is held in the mounting member 5 via the elastic members 6, with a space ensured between the receiving side housing 10 and the mounting member 5 (for example refer to FIG. 6). In this way, the receiving side housing 10 does not have to be placed in a position biased in respect to the floating range.

In one or more embodiments, the Y direction elastic members 6Y are arranged to the side in the vertical direction when seen from the receiving side housing 10. In this way, the receiving side housing 10 is not placed in a position biased to a lower side in respect to the floating range due to influence of force of gravity and the like.

Further, in one or more embodiments, the X direction elastic members 6X, which are different from the Y direction elastic members 6Y, are arranged between the mounting member 5 and the receiving side housing 10 to the side in the X direction (direction that intersects with the vertical direction) seen from the receiving side housing 10. In this way by having the Y direction elastic members 6Y and the X direction elastic members 6X, relative misalignment between the receiving side optical connector 3 and the movable side optical connector 7 in the direction perpendicular to the Z direction (connector insertion and removal direction) can be allowed.

Further, in one or more embodiments, the pair of the elastic members 6 are arranged between the receiving side housing 10 and the mounting member 5, such as to sandwich the receiving side housing 10 from the direction perpendicular to the Z direction (connector insertion and removal direction). In this way, the receiving side housing 10 can be placed in a neutral position in respect to the floating range.

Further, in one or more embodiments, the receiving side housing 10 is held in the mounting member 5 via the elastic members 6, to have elasticity in respect to movement in the direction of rotation with the Z direction (connector insertion and removal direction) as an axis. In this way, because movement of the receiving side housing 10 in the direction of rotation about the Z axis in respect to the mounting member 5 is allowed, supposing that in the initial stage the relative positional relation between the receiving side optical connector 3 and the movable side optical connector 7 is misaligned about the Z axis, when the connector is connected the misalignment can be absorbed. Further, after the movable side optical connector 7 has been extracted, the receiving side housing 10 can return to the initial position in respect to the mounting member 5.

Further, in one or more embodiments, the elastic members 6 are configured as the leaf spring that is wide, and one end of the leaf spring contacts the receiving side housing 10 (outer housing 11) and another end of the leaf spring contacts the mounting member 5. In this way, the receiving side housing 10 being held in the mounting member 5 via the elastic members 6 such as to have elasticity in respect to movement in the direction of rotation with the Z direction (connector insertion and removal direction) as the axis can be realized.

Further, in one or more embodiments, one of the end parts of the leaf spring is a fixed end, and the opposite side end part is a free end (for example, refer to FIG. 4B). In this way, the end part of the leaf spring to the side of the free end becomes slidable, and the elastic members 6 become easily deformed, and the receiving side housing 10 can easily move in respect to the mounting member 5.

Further, in one or more embodiments, the mounting member 5 is a rectangular tube member that surrounds the receiving side housing 10, and in one side surface of the rectangular tube shaped mounting member 5 is fixed to the middle plane 1 parallel to the Z direction. With such a configuration, the optical connector body 4 of the receiving side optical connector 3 that inserts and removes the movable side optical connector 7 in the Z direction being attached to the middle plane 1, to be floatable in the XY direction in respect to the middle plane 1 parallel to the Z direction can be realized.

Further, in one or more embodiments, the mounting member 5 has the positioning pins 5A that are fitted to the positioning holes 1A in the middle plane 1 (board). In this way, the position of the mounting member 5 can be aligned in respect to the middle plane 1.

Further, in one or more embodiments, the positioning pins 5A have the screw part (for example, the male screw part 5C or the female screw part 5E) to screw the mounting member 5 to the middle plane 1. In this way, even when the surface to the side of the middle plane 1 of the mounting member 5 is small, the mounting member 5 can be positioned and screwed and fixed to the middle plane 1.

REFERENCE SIGNS LIST 1 middle plane, 1A positioning hole,
2 printed board,
3 receiving side optical connector,
4 optical connector body,
5 mounting member, 5A positioning pin,
6 elastic member,
6Y Y direction elastic member, 6X X direction elastic member,
7 movable side optical connector,
10 receiving side housing,
11 outer housing,
113 front side opening, 114 shutter, 116 side surface opening,
12 inner housing, 121 module mounting part,
13 receiving side connecting mechanism,
20 movable side housing, 21 outer housing,
215 rear side opening, 216 side surface opening,
22 inner housing, 221 module mounting part,
222 insertion part, 222A protrusion, 223 arm part,
23 movable side connecting mechanism,
50 optical module, 51 ferrule,
52 pin clamp, 53 spring, 54 spring push,
100 optical connector system Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

The invention claimed is:

1. An optical connector comprising:
   an inner housing that houses a ferrule;
   an outer housing that detachably houses the inner housing in connector insertion and removal directions;
   a mounting member that movably attaches the inner housing to a board in a direction perpendicular to the connector insertion and removal directions; and
   a first elastic member arranged between the mounting member and the outer housing,
   wherein the inner housing is held in the mounting member via the first elastic member, with a space maintained between a peripheral surface of the outer housing and the mounting member.

2. The optical connector according to claim 1, wherein the first elastic member is arranged on a side in a vertical direction when viewed from the outer housing.

3. The optical connector according to claim 2, further comprising: a second elastic member arranged between the outer housing and the mounting member on a side in a direction that intersects with the vertical direction when viewed from the outer housing.

4. The optical connector according to claim 1, wherein a pair of the first elastic member, arranged between the outer housing and the mounting member, sandwiches the outer housing in a direction perpendicular to the connector insertion and removal directions.

5. The optical connector according to claim 1, wherein the outer housing is held in the mounting member via the first elastic member to have elasticity in a direction of a rotation around the connector insertion and removal directions.

6. The optical connector according to claim 5, wherein the first elastic member is a leaf spring, and
   a first end of the leaf spring is in contact with the outer housing, and a second end of the leaf spring is in contact with the mounting member.

7. The optical connector according to claim 6, wherein one of the first end and the second end of the leaf spring is fixed to the outer housing or the mounting member, and the other of the one of the first end and the second end of the leaf spring is a free end.

8. The optical connector according to claim 1, wherein the mounting member is a rectangular tube member surrounding the outer housing, and one side surface of the mounting member is fixed to the board that comprises a board surface parallel to the connector insertion and removal directions.

9. The optical connector according to claim 8, wherein the mounting member comprises a positioning pin that is fitted in a positioning hole of the board.

10. The optical connector according to claim 9, wherein the positioning pin comprises a screw part that screws the mounting member to the board.

* * * * *